US009976576B2

(12) United States Patent
Brittan et al.

(10) Patent No.: US 9,976,576 B2
(45) Date of Patent: May 22, 2018

(54) HYDRAULIC DISTRIBUTION SYSTEM EMPLOYING A DUAL PUMP

(75) Inventors: Jerry J. Brittan, Mattawan, MI (US); Graeme Andrew Jackson, Kalamazoo, MI (US)

(73) Assignee: Eaton Intelligent Power Limited, Dublin (IE)

(*) Notice: Subject to any disclaimer, the term of this patent is extended or adjusted under 35 U.S.C. 154(b) by 1945 days.

(21) Appl. No.: 13/279,939

(22) Filed: Oct. 24, 2011

(65) Prior Publication Data
US 2013/0098468 A1    Apr. 25, 2013

(51) Int. Cl.
| F15B 11/17 | (2006.01) |
|---|---|
| F16H 61/02 | (2006.01) |
| F16D 48/02 | (2006.01) |
| F16H 61/00 | (2006.01) |

(52) U.S. Cl.
CPC .............. *F15B 11/17* (2013.01); *F16D 48/02* (2013.01); *F16H 61/0025* (2013.01); *F16H 61/0206* (2013.01); *F15B 2211/20538* (2013.01); *F15B 2211/20592* (2013.01); *F15B 2211/2654* (2013.01); *F15B 2211/30505* (2013.01); *F15B 2211/41518* (2013.01); *F15B 2211/5152* (2013.01); *F15B 2211/611* (2013.01); *F15B 2211/615* (2013.01); *F15B 2211/62* (2013.01); *F15B 2211/7142* (2013.01); *F16D 2048/029* (2013.01); *F16D 2048/0242* (2013.01); *F16D 2048/0281* (2013.01); *Y10T 137/0318* (2015.04); *Y10T 137/0396* (2015.04); *Y10T 137/86163* (2015.04)

(58) Field of Classification Search
CPC ................ F15B 11/17; F15B 2211/71; F15B 2211/30525; F15B 2211/20584; F15B 2211/20592; F16H 61/448; Y10T 137/86163
USPC .......... 137/565.33; 417/286, 287; 192/113.3; 60/428, 430, 484, 486; 4/565.33
See application file for complete search history.

(56) References Cited

U.S. PATENT DOCUMENTS

| 2008/0179158 A1* | 7/2008 | De Maziere ............... 192/58.6 |
| 2010/0204008 A1* | 8/2010 | Azuma et al. .............. 477/115 |
| 2010/0281859 A1* | 11/2010 | Oka ........................... 60/459 |

FOREIGN PATENT DOCUMENTS

| EP | 1881222 A1 | 1/2008 |
| WO | WO-2004092618 A1 | 10/2004 |

\* cited by examiner

*Primary Examiner* — Atif Chaudry
(74) *Attorney, Agent, or Firm* — Fishman Stewart PLLC

(57) ABSTRACT

Disclosed is an exemplary hydraulic system including a first fluid circuit and a first pump fluidly connected to the first fluid circuit. The first pump configured to produce a fluid output at a first flow rate when operated at a selected speed. The hydraulic system further includes a second fluid circuit and a second pump selectively fluidly connectable to the first fluid circuit and the second fluid circuit. The second pump configured to produce a fluid output at a second flow rate when operated at the selected speed, with the second flow rate being greater than the first flow rate of the first pump. A first valve fluidly connects the second pump to the first fluid circuit when the first valve is arranged in an open position, and fluidly connects the second pump to second fluid circuit when the first valve is arranged in a closed position.

25 Claims, 4 Drawing Sheets

HYDRAULIC DISTRIBUTION SYSTEM EMPLOYING A DUAL PUMP

BACKGROUND

A hydraulic system may include a variety of hydraulically actuated components, each of which may have different flow and pressure requirements that can vary over time. The hydraulic system may include a pump for supplying a flow of pressurized fluid to the hydraulic components. The pump may have a variable or fixed displacement configuration. Fixed displacement pumps are generally smaller, lighter, and less expensive than variable displacement pumps. Generally speaking, fixed displacement pumps deliver a finite volume of fluid for each cycle of pump operation. The output volume of a fixed displacement pump can be controlled by adjusting the speed of the pump. The pump may be sized to satisfy a maximum flow requirement of the hydraulic system. Closing or otherwise restricting the outlet of a fixed displacement pump will generally cause a corresponding increase in the system pressure. To avoid over pressurizing the hydraulic system, fixed displacement pumps typically utilize a pressure regulator or an unloading valve to control the pressure level within the system during periods in which the pump output exceeds the flow requirements of the hydraulic components. The pressure regulator or unloading valve operates to redirect the excess fluid back to a hydraulic system sump to be re-pressurized by the pump. This method of controlling system pressure and flow may result in a significant reduction in the operating efficiency of the hydraulic system depending on the duration and magnitude of excess pump flow. The hydraulic system may further include various valves for controlling the distribution of the pressurized fluid to various hydraulic components.

DETAILED DESCRIPTION

Figure 1:
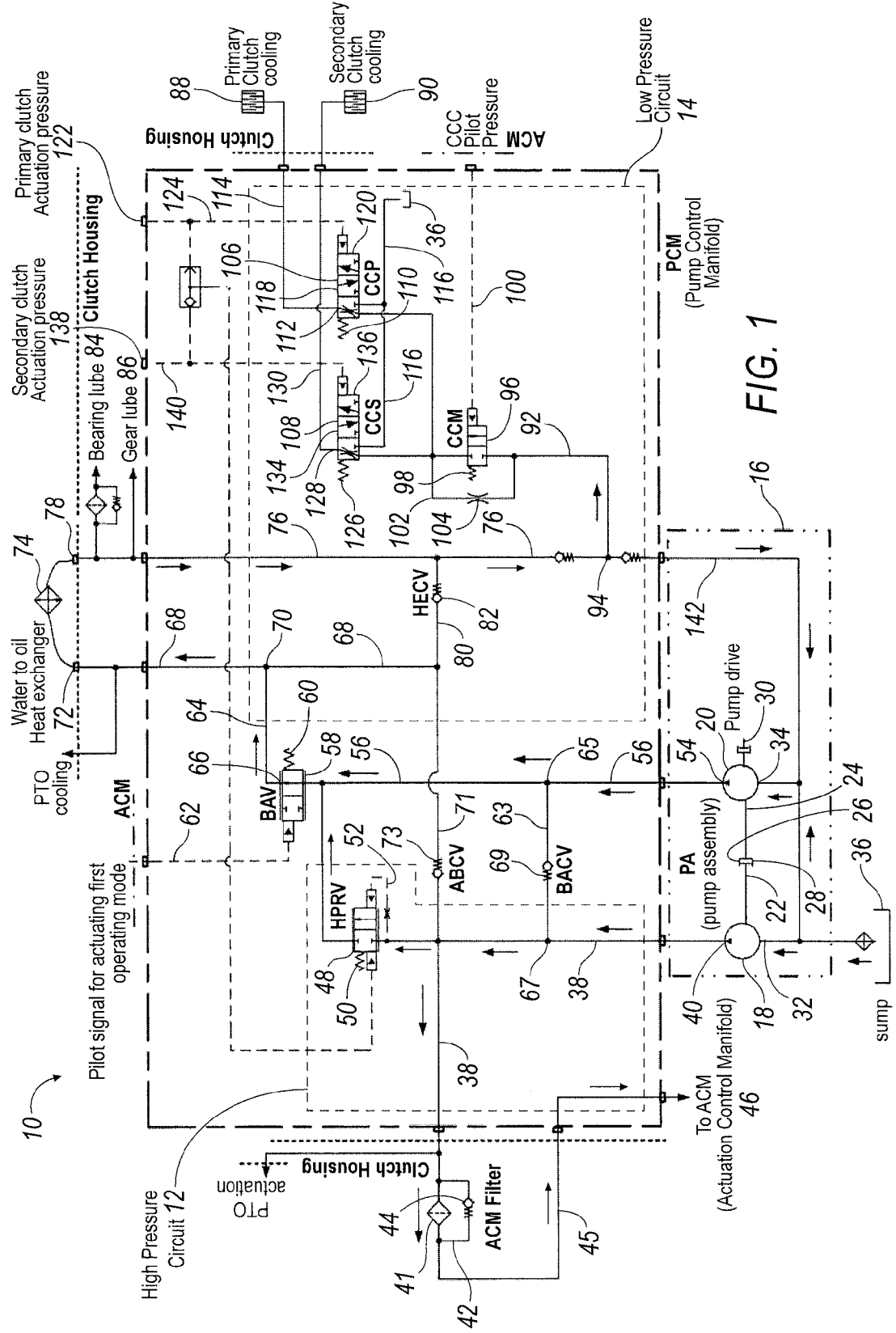
FIG. 1 is a schematic illustration of an exemplary hydraulic system employing dual pumps for supply pressurized fluid to a high-pressure circuit and a low-pressure circuit, the hydraulic system operating in a first mode.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

FIG. 1 schematically illustrates an exemplary pressurized fluid distribution system 10 operable for selectively distributing a pressurized fluid to various hydraulically actuated components. Fluid distribution system 10 may have various configurations depending on the requirements of a particular application. For example, the exemplary fluid distribution systems illustrated in FIGS. 1-4 are configured for use in automotive transmission applications. The illustrated fluid distribution systems operate to distribute pressurized fluid for use in activating clutches, initiating gearshifts, and providing clutch cooling and lubrication, as well providing other functions.

Fluid distribution system 10 may include multiple hydraulic circuits for selectively distributing the pressurized fluid to various hydraulically actuated components associated with the respective hydraulic circuits. For purposes of illustration, fluid distribution system 10 is shown to include two separate hydraulic circuits, although in practice fewer or more hydraulic circuits may be provided depending on the requirements of a particular application. By way of example, the two hydraulic circuits may include a high-pressure circuit 12 and a low-pressure circuit 14. Pressurized fluid distributed by high-pressure circuit 12 may be used to actuate hydraulic components that generally have high-pressure and low flow requirements, such as a clutch actuation. Pressurized fluid distributed by low-pressure circuit 14 may provide lubrication for gears and bearings, and cooling for clutches. These latter functions typically have higher flow and lower pressure requirements than other functions, such as clutch actuation.

With continued reference to FIG. 1, a pump assembly 16 may provide pressurized fluid for distribution by high-pressure circuit 12 and low-pressure circuit 14. Pump assembly 16 may include one or more pumps. The illustrated exemplary configuration includes two pumps, but additional pumps may also be employed depending and the design and performance requirements of a particular application. Exemplary pump assembly 16 may include a first pump 18 and a second pump 20. First pump 18 may be fluidly connected to high-pressure circuit 12 to provide a dedicated source of pressurized fluid. Second pump 20 may be selectively connected to either high-pressure circuit 12 or low-pressure circuit 14 depending on the flow requirement of high-pressure circuit 12. Generally the output flow from second pump 20 will be directed to low-pressure circuit 14 to provide lubrication for gears and bearing, and cooling for clutches. Certain operations, however, such as clutch actuation, may include brief periods in which the flow requirement of high-pressure circuit 12 exceeds the flow output of first pump 18. The additional flow may be satisfied by temporarily directing the fluid output from second pump 20 to high-pressure circuit 12. During this period, at least a portion of the fluid flow from second pump 20 will generally be diverted away from low-pressure circuit 14. Once the excess flow requirement of high-pressure circuit 12 has abated, the diverted flow from second pump 20 may once again be directed to low-pressure circuit 14.

First pump 18 may be mounted to a first drive shaft 22 and second pump 20 may be mounted to a second drive shaft 24. First drive shaft 22 may be fixedly connected to second drive shaft 24 via a coupling 26 to enable first pump 18 and second pump 20 to rotate in unison, and thus be operated at substantially the same speed (e.g., revolutions per minute (rpm)). Alternatively, first drive shaft drive shaft 22 and second drive shaft 24 may be interconnected via a suitably configured gear box 28 to enable the first and second pumps to rotate at a selected fixed speed ratio relative to one another. First drive shaft 22 and second drive shaft 24 may also be integrated as a single shaft. First drive shaft 22 and second drive shaft 24 may be connected to an external power source 30, such as an engine, electric motor, or other power source capable of outputting a rotational torque. An inlet port 32 of first pump 18 and an inlet port 34 of second pump 20 may be fluidly connected to a fluid sump 36 that provides a source of hydraulic fluid for the pumps.

First pump 18 and second pump 20 may include any of a variety of known fixed displacement pumps, including but not limited to, gear pumps, vane pumps, axial piston pumps, and radial piston pumps. The pumps may be substantially the same size, or have a different size. The size of a fixed displacement pump may be defined in terms of its fluid output rate when operated at a particular speed (e.g., revolutions per minute (rpm)). Increasing the size of the pump generally produces a corresponding increase in the output rate of the pump. For example, a first pump capable of outputting 5 Liters/minute when operated at a speed of 1000 rpm is consider to be smaller than a second pump capable of outputting 6 Liters/minute when operated at the same speed. For purposes of discussion, first pump 18 is sized smaller size than second pump 20. In practice, however, first pump 18 may be sized larger than second pump 20, or both pumps may have substantially the same size.

Continuing to refer to FIG. 1, high-pressure circuit 12 may include a fluid passage 38 fluidly connected to a discharge port 40 of first pump 18. Fluid passage 38 may be fluidly connected to a filter 41 for removing debris and other impurities from the pressurized fluid. A filter bypass passage 42 to may be provided to allow the pressurized fluid to bypass filter 41, should the filter become clogged or otherwise restrict the flow of fluid through the filter. Filter bypass passage 42 may include a check valve 44 for limiting a pressure drop across filter 41. Check valve 44 operates to sense a pressure drop across filter 41, and may be configured to open when the pressure drop exceeds a predetermined magnitude. The filtered fluid may be directed through a fluid passage 45 to an actuation control manifold 46 (ACM), which operates to direct the pressurized fluid to the desired hydraulic components.

When configured as a fixed displacement pump, first pump 18 generally delivers a finite volume of fluid for each cycle of pump operation. Closing or otherwise restricting discharge port 40 of first pump 18 will generally cause a corresponding increase in pressure within high-pressure circuit 12. To avoid over pressurizing high-pressure circuit 12, a high-pressure relief valve 48 (HPRV) may be employed to control a pressure level within high-pressure circuit 12 during periods in which the output of first pump 18 exceeds the flow requirements of the hydraulic components supplied by high-pressure circuit 12. High-pressure relief valve 48 may be configured as a pilot controlled two-way two-port valve. A biasing member 50 biases high-pressure relief valve 48 toward a default closed position. Pressurized fluid from high-pressure circuit 12 is substantially blocked from flowing through high-pressure relief valve 48 when the valve is arranged in the closed position. High-pressure relief valve 48 is illustrated in FIGS. 1-4 in the closed position.

A pressure tap 52 may be used to detect a pressure level within high-pressure circuit 12. Pressure tap 52 provides a pilot pressure that tends to move high-pressure relief valve 48 toward an open position. Fluid from high-pressure circuit 12 flows through high-pressure relief valve 48 when arranged in the open position. A minimum pressure level within high-pressure circuit 12 may be controlled by adjusting the biasing force exerted by biasing member 50 when high-pressure relief valve 48 is arranged in the closed position. High-pressure relief valve 48 will generally not begin to open until the pilot pressure supplied by pressure tap 52 exceeds the biasing force exerted by biasing member 50. Although high-pressure relief valve 48 is illustrated as a pilot controlled two-way two-port valve, it shall be appreciated that other valve configurations may also be used depending on the particular application.

Continuing to refer to FIG. 1, low-pressure circuit 14 may be fluidly connected to a discharge port 54 of second pump 20 by means of a low-pressure circuit fluid supply passage 56. A blocking actuation valve 58 may be provided to selectively control delivery of pressurized fluid from second pump 20 to low-pressure circuit 14. Blocking actuation valve 58 may be configured as a pilot actuated two-way two-port valve. A biasing member 60 biases blocking actuation valve 58 to a default open position. Pressurized fluid from second pump 20 is allowed to flow through blocking actuation valve 58 when arranged in the open position. Blocking actuation valve 58 is illustrated in FIGS. 1 and 3 in the open position and in FIGS. 2 and 4 in a closed position. Blocking valve 58 may be configured as an on/off valve, or may be configured for variable output, which may be enabled by positioning blocking valve 58 at one or more intermediate positions between fully closed and fully open. A pilot pressure signal for controlling operation of blocking actuation valve 58 may be produced by an associated vehicle transmission and delivered to the valve through a pilot signal passage 62. The pilot signal is used to move blocking actuation valve 58 to a closed position to substantially block pressurized fluid from second pump 20 from flowing to low-pressure circuit 14. Although blocking actuation valve 58 is illustrated as a pilot actuated two-way two-port valve, it shall be appreciated that other valve configurations may also be used depending on the particular application.

Second pump 20 may be selectively fluidly connected to fluid passage 38 of high-pressure circuit 12 by way of a blocking actuation passage 63. One end of blocking actuation passage 63 may be fluidly connected to low-pressure circuit fluid supply passage 56 at a fluid junction 65, and an opposite end fluidly connected to fluid passage 38 at fluid junction 67. Blocking actuation passage 63 may include a blocking actuation check valve 69 (BACV) operable to substantially block fluid present within high-pressure circuit 12 from flowing through blocking actuation passage 63 to low-pressure circuit supply passage 56 under all operating conditions. Blocking actuation check valve 69 may be configured to allow pressurized fluid from second pump 20 to pass through the valve to high-pressure circuit 12 when a predetermined pressure drop across blocking actuation check valve 69 is exceeded. The pressure drop being such that the pressure within low-pressure circuit supply passage 56 is greater than the pressure within fluid passage 38 of high-pressure circuit 12.

Blocking actuation check valve 69 may be configured to be infinitely moveable between a fully closed position, in which fluid output from second pump 20 is substantially blocked from passing through the valve to high-pressure circuit 12, and a fully open position, in which substantially all or a portion of the fluid output from second pump 20 is allowed to pass through the valve to high-pressure circuit 12. Blocking actuation check valve 69 may be configured to operate in response to a pressure drop occurring across the valve. For example, blocking actuation check valve 69 may be configured to commence opening at a predetermined minimum pressure drop occurring across the valve. Further increasing the pressure drop causes blocking actuation check valve 69 to further open, thereby increasing the flow rate through the valve from low-pressure circuit supply passage 56 to high-pressure circuit 12.

Under certain circumstances the combined fluid flow from first pump 18 and second pump 20 may exceed the flow requirement of high-pressure circuit 12. An actuation bypass passage 71 may be provided to redirect the excess flow to low-pressure circuit 14. Actuation bypass passage 71 may include an actuation bypass check valve 73 (ABCV) operable to substantially block fluid present within low-pressure circuit 14 from flowing through actuation bypass passage 71 to high-pressure circuit 12. Actuation bypass check valve 73 may be configured to allow pressurized fluid from high-pressure circuit 12 to pass through the valve to low-pressure circuit 14 when a predetermined pressure drop across actuation bypass check valve 73 is exceeded.

Arranging blocking actuation valve 58 in the open position allows pressurized fluid from second pump 20 to flow to low-pressure circuit 14 through a BAV fluid discharge passage 64, which may be fluidly connected to a discharge port 66 of blocking actuation valve 58. BAV fluid discharge passage 65 may be fluidly connected to a heat exchanger inlet passage 68 at fluid junction 70. Heat exchanger inlet passage 68 is fluidly connected to an inlet port 72 of a heat exchanger 74. Heat exchanger 74 may include various configurations, including but not limited to, a water to oil heat exchanger. When configured as a water to oil heat exchanger, a portion of the heat contained within the pressurized fluid passing through heat exchanger 74 may be transferred to water flowing over the heat exchanger.

A heat exchanger discharge passage 76 may be fluidly connected to a discharge port 78 of heat exchanger 74. A heat exchanger bypass passage 80 may be provided to allow the pressurized fluid to bypass heat exchanger 74, should the heat exchanger become clogged or otherwise restrict the flow of fluid through the heat exchanger. Heat exchanger bypass passage 80 may include a heat exchanger check valve 82 (HECV) for limiting a pressure drop across heat exchanger 74. Heat exchanger check valve 82 senses a pressure drop across heat exchanger 74 and may be configured to open when the pressure drop exceeds a predetermined magnitude.

Pressurized fluid discharged from heat exchanger 74 may be used to provide bearing 84 and gear 86 lubrication. Pressurized fluid not used for bearing and gear lubrication may provide cooling for a primary clutch 88 and a secondary clutch 90. Pressurized fluid for clutch cooling may be diverted to primary clutch 88 and secondary clutch 90 through a clutch cooling supply passage 92 fluidly connected to heat exchanger discharge passage 76 at a fluid junction 94. A clutch cooling modulating valve 96 (CCM) may be provided to selectively control delivery of pressurized fluid for clutch cooling. Clutch cooling modulating valve 96 may be configured as a pilot actuated two-way two-port valve. A biasing member 98 biases clutch cooling modulating valve 96 to a default closed position. Pressurized fluid is allowed to flow through clutch cooling modulating valve 96 when arranged in the open position. Flow through cooling modulating valve 96 is substantially blocked when the valve is arranged in the closed position. Clutch cooling modulating valve 96 is illustrated in FIGS. 1-4 in the closed position.

A pilot pressure signal for controlling operation of clutch cooling modulating valve 96 may be provided by the associated vehicle transmission and delivered to the valve through a pilot signal passage 100. To ensure a minimum flow of pressurized fluid for cooling is delivered to the clutches, a clutch cooling modulating valve bypass passage 102 having a calibrated orifice 104 may be provide. Clutch cooling modulating valve bypass passage allows a predetermined quantity of pressurized fluid to flow to the clutches when clutch cooling modulating valve 96 is arranged in the closed position. Although clutch cooling modulating valve 96 is illustrated as a pilot actuated two-way two-port valve, it shall be appreciated that other valve configurations may also be used depending on the particular application.

The distribution of pressurized fluid received from clutch cooling modulating valve 96 and clutch cooling modulating valve bypass passage 102 may be selectively controlled by a clutch cooling primary valve 106 (CCP) and a clutch cooling secondary valve 108 (CCS). Clutch cooling primary valve 106 is operable to control the flow of pressurized cooling fluid to primary clutch 88, and clutch cooling secondary valve 108 is operable to control the flow of pressurized cooling fluid to secondary clutch 90.

Clutch cooling primary valve 106 may be configured as a pilot actuated three-way three-port valve. A biasing member 110 biases clutch cooling primary valve 106 to a default position in which a calibrated orifice 112 allows pressurized fluid received from clutch cooling modulating valve 96 and clutch cooling modulating valve bypass passage 102 to flow to primary clutch 88 through a primary clutch cooling supply passage 114. Clutch cooling primary valve 106 is illustrated in FIGS. 1-4 in the default position. Clutch cooling primary valve 106 may also be arranged in an intermediate position 118, in which cooling fluid from primary clutch 88 is allowed to flow back through clutch cooling primary valve 106 and is returned to sump 36 by way of a return passage 116. Clutch cooling primary valve 106 may be arranged in a third position 120, in which pressurized fluid received from clutch cooling modulating valve 96 and clutch cooling modulating valve bypass passage 102 is allowed to flow to primary clutch 88 through primary clutch cooling supply passage 114. Third position 120 provides a higher flow rate than the default position in which fluid flows through calibrated orifice 112. A pilot pressure signal for controlling operation of clutch cooling primary valve 106 may be provided by a primary clutch actuation pressure 122, and delivered to the valve through a pilot signal passage 124.

Clutch cooling secondary valve 108 may be configured as a pilot actuated three-way three-port valve. A biasing member 126 biases clutch cooling secondary valve 108 to a default position, in which a calibrated orifice 128 allows pressurized fluid received from clutch cooling modulating valve 96 and clutch cooling modulating valve bypass passage 102 to flow to secondary clutch 90 through a secondary clutch cooling supply passage 130. Clutch cooling secondary valve 108 is illustrated in FIGS. 1-4 in the default position. Clutch cooling secondary valve 108 may also be arranged in an intermediate position 134, in which cooling fluid from secondary clutch 90 is allowed to flow back through clutch cooling secondary valve 108 and is returned to sump 36 by way of return passage 116. Clutch cooling secondary valve 108 may be arranged in a third position 136, in which pressurized fluid received from clutch cooling modulating valve 96 and clutch cooling modulating valve bypass passage 102 is allowed to flow to secondary clutch 90 through secondary clutch cooling supply passage 130. Third position 136 provides a higher flow rate than the default position in which fluid flows through calibrated orifice 128. A pilot pressure signal for controlling operation of clutch cooling secondary valve 108 may be provided by a secondary clutch actuation pressure 138, and delivered to the valve through a pilot signal passage 140.

Excess pressurized fluid passing through heat exchanger discharge passage 76 and not used for bearing and gear lubrication, or clutch cooling, may be directed back to second pump 20 through a return passage 142 to be re-pressurized.

Figure 2:
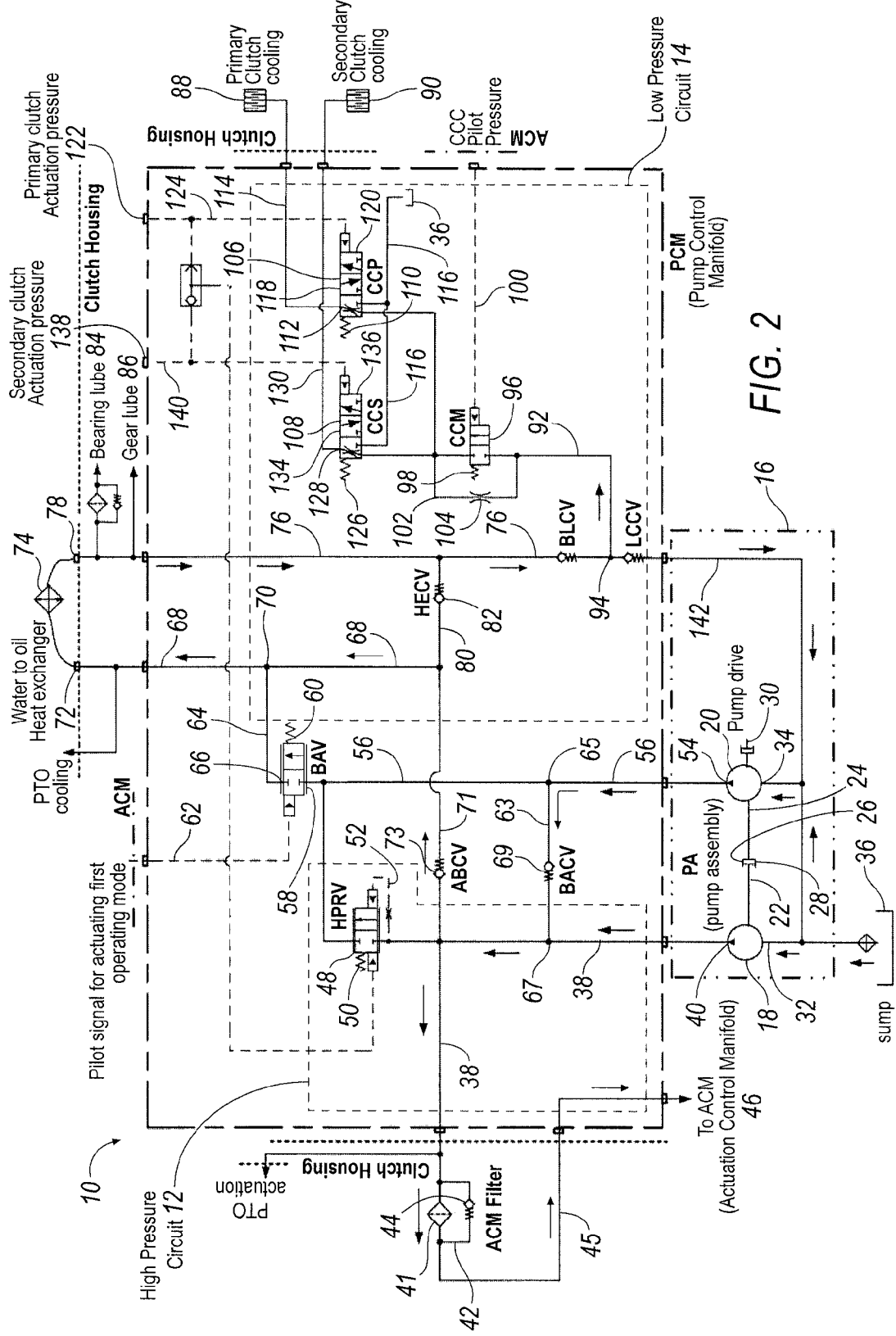
FIG. 2 is a schematic illustration of the exemplary hydraulic system of FIG. 1 operating in a second mode.
Figure 3:
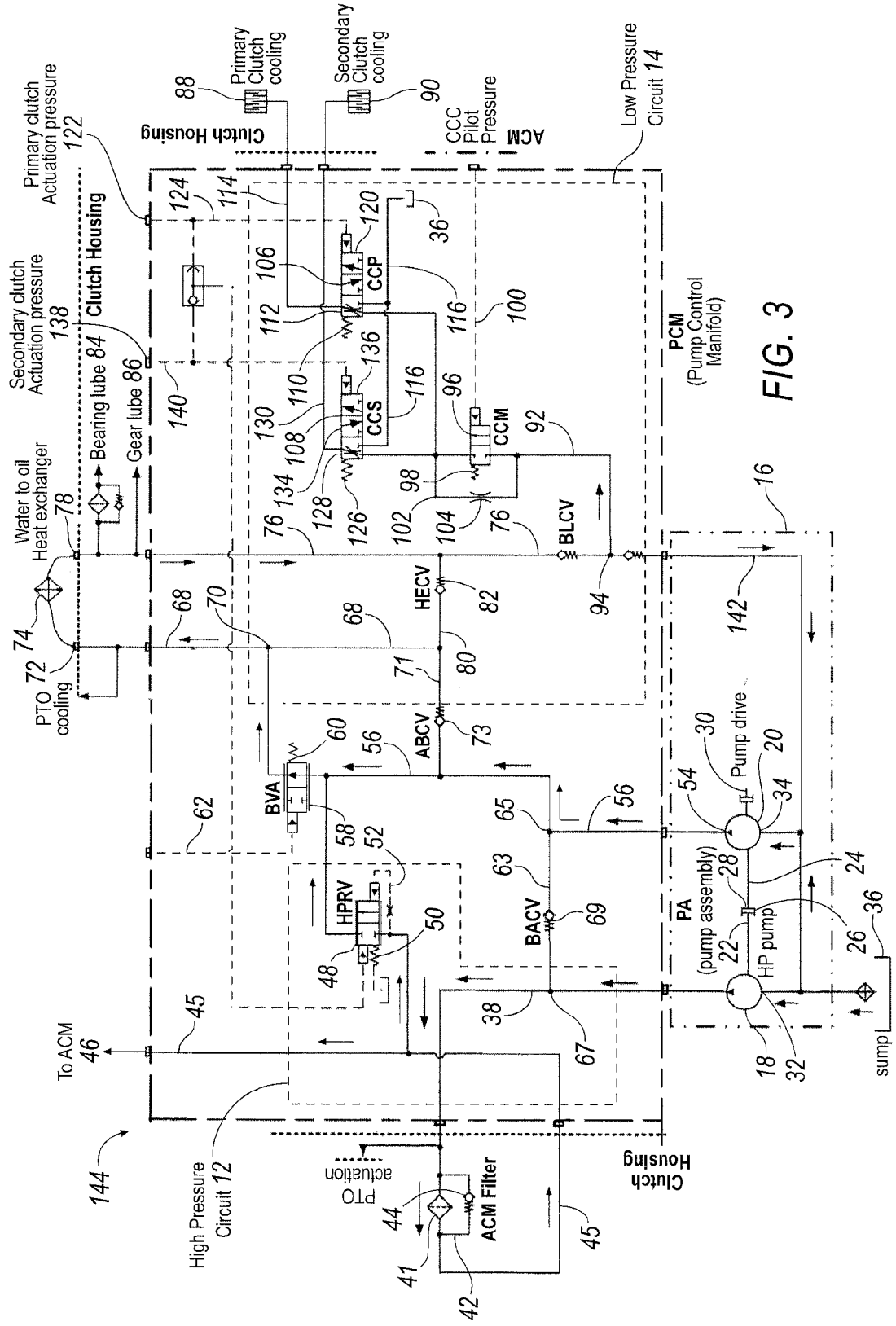
FIG. 3 is a schematic illustration of an alternatively configured exemplary hydraulic system employing dual pumps for supply pressurized fluid to a high-pressure circuit and a low-pressure circuit, the hydraulic system operating in the first mode.

Referring to FIGS. 1 and 2, pressurized fluid distribution system 10 may be operated in a first non-actuation mode, in which pressurized fluid from second pump 20 is delivered to low-pressure circuit 14, and a second actuation mode, in which at least a portion of pressurized fluid from second pump 20 is directed away from low-pressure circuit 14 and delivered to high-pressure circuit 12. FIG. 1 illustrates the fluid path traveled by the pressurized fluid produced by first pump 18 and second pump 20 when operating in the first mode. FIG. 2 illustrates the fluid path traveled by the pressurized fluid when operating in the second mode with blocking actuation valve 58 arranged in substantially the fully closed position. Arranging blocking actuation valve 58 in an intermediate position between the fully closed and fully position causes the fluid output from second pump 20 to be apportioned between high pressure circuit 12 and low-pressure circuit 14 With blocking actuation valve 58 arranged in an intermediate position, pressurized fluid from second pump 20 travels through blocking actuation passage 63 to high-pressure circuit 12 (as illustrated in FIG. 2), and the remainder of the fluid travels through blocking actuation valve 58 to low-pressure circuit 14 (as illustrated in FIG. 1).

Fluid distribution system 10 may be generally operated in the first mode when the flow output from first pump 18 is sufficient to satisfy the flow requirement of high-pressure circuit 12. However, there may be instances in which the flow requirement of high-pressure circuit 12 temporarily exceeds the flow output of first pump 18. When this occurs, fluid distribution system 10 may be operated in the second mode, in which at least a portion of the fluid output of second pump 20 is directed away from low-pressure circuit 14 and delivered to high-pressure circuit 14 to satisfy the temporary excess flow requirement. The first mode may be reinitiated, and the flow output from second pump 20 directed back to low-pressure circuit 14, when the excess flow requirement of high-pressure circuit 12 no longer exists.

Referring to FIG. 1, the first mode may be actuated by arranging blocking actuation valve 58 in the open position, which allows pressurized fluid from second pump 20 to pass through blocking actuation valve 58 to low-pressure circuit 14. With blocking actuation valve 58 arranged in the open position, the pressure within low-pressure circuit fluid supply passage 56 will generally be lower than the pressure within fluid passage 38 of high-pressure circuit 12. This generally results in a pressure drop across blocking actuation check valve 69 that is less than the predetermined pressure drop required to open the check valve, thereby substantially preventing pressurized fluid from second pump 20 flowing through blocking actuation passage 63 to high-pressure circuit 12.

With reference to FIG. 2, the second mode may be actuated by arranging blocking actuation valve 58 in the fully closed position, or an intermediate position between the fully closed position and the substantially fully open position, thereby blocking at least a portion of the flow of pressurized fluid from pump 20 to low-pressure circuit 12. Arranging blocking actuation valve 58 in the closed position, or an intermediate position between the closed and fully open positions, generally causes a corresponding increase in pressure within low-pressure circuit supply passage 56. The pressure increase within low-pressure circuit fluid supply passage 56 required to transition from the first mode to the second mode may be achieved without having to adjust the operating speed of first pump 18 and second pump 20. This may cause the pressure within low-pressure circuit fluid supply passage 56 to exceed the pressure within fluid passage 38 of high-pressure circuit 12, resulting in a corresponding pressure drop across blocking actuation check valve 69. When the pressure drop exceeds the predetermined pressure drop required to open blocking actuation check valve 69, the pressurized fluid from second pump 20 will commence flowing through blocking actuation passage 63 to high-pressure circuit 12, thereby providing additional fluid to satisfy the temporary excess flow requirement of high-pressure circuit 12.

Figure 4:
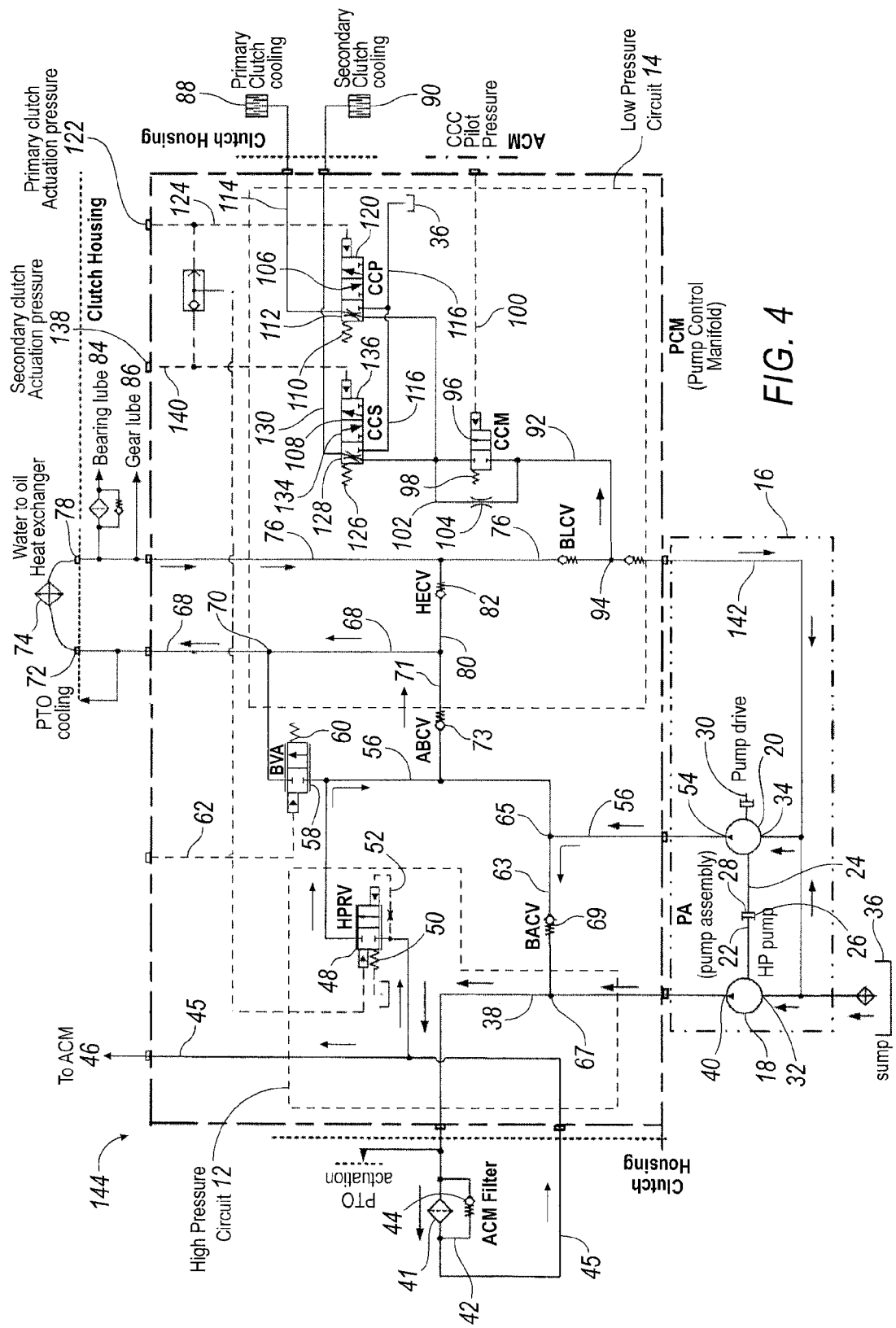
FIG. 4 is a schematic illustration of the exemplary hydraulic system of FIG. 3 operating in the second mode.

Referring to FIGS. 3 and 4, an alternatively configured fluid distribution system 144 is illustrated. Fluid distribution system 144 generally includes the same hydraulic components as fluid distribution system 10 illustrated in FIGS. 1 and 2, but with certain hydraulic components arranged at different fluid locations within the hydraulic circuit. For example, high-pressure relief valve 48 in fluid distribution system 144 may be arranged downstream of filter 41, rather than upstream, as in fluid distribution system 10. An inlet of high-pressure relief valve 48 may be fluidly connected to fluid passage 45 in fluid distribution system 144. The inlet of high-pressure relief valve 48 is fluidly connected to fluid passage 38 in fluid distribution system 10. In addition, actuation bypass passage 71 and actuation check valve 72 may be alternatively arranged downstream of high-pressure relief valve 48. In this arrangement, actuation bypass passage 71 may be fluidly connected to low-pressure circuit fluid supply passage 56. Actuation bypass passage 71 may be fluidly connected to fluid passage 38 of high-pressure circuit 12 in fluid distribution system 10.

Fluid distribution system 144 operates in substantially the same manner as previously described in connection with fluid distribution system 10. For example, with reference to FIGS. 3 and 4, fluid distribution system 144 may be operated in the first non-actuation mode, in which pressurized fluid from second pump 20 is delivered to low-pressure circuit 14, and the second actuation mode, in which at least a portion of pressurized fluid from second pump 20 is directed away from low-pressure circuit 14 and delivered to high-pressure circuit 12. FIG. 3 illustrates the fluid path traveled by the pressurized fluid produced by first pump 18 and second pump 20 when operating in the first mode. FIG. 4 illustrates the fluid path traveled by the pressurized fluid when operating in the second mode with blocking actuation valve 58 arranged in substantially the fully closed position. Arranging blocking actuation valve in an intermediate position between the fully closed and fully position causes the fluid output from second pump 20 to be apportioned between high pressure circuit 12 and low-pressure circuit 14. With blocking actuation valve 58 arranged in an intermediate position, pressurized fluid from second pump 20 travels through blocking actuation passage 63 to high-pressure circuit 12 (as illustrated in FIG. 3), and the remainder of the fluid travels through blocking actuation valve 58 to low-pressure circuit 14 (as illustrated in FIG. 4).

Fluid distribution system 144 may generally be operated in the first mode when the fluid output from first pump 18 is sufficient to satisfy the flow requirement of high-pressure circuit 12. However, there may be instances in which the flow requirement of high-pressure circuit 12 temporarily exceeds the fluid output of first pump 12. When this occurs, fluid distribution system 144 may be operated in the second mode, in which at least a portion of the fluid output of second pump 20 is directed away form low-pressure circuit 14 and delivered to high-pressure circuit 12 to satisfy the temporary excess flow requirement. The first mode may be reinitiated, and the flow output from second pump 20 directed back to low-pressure circuit 14, when the excess flow requirement of high-pressure circuit 12 no longer exists.

It will be appreciated that the exemplary hydraulic system described herein has broad applications. The foregoing configurations were chosen and described in order to illustrate principles of the methods and apparatuses as well as some practical applications. The preceding description enables others skilled in the art to utilize methods and apparatuses in various configurations and with various modifications as are suited to the particular use contemplated. In accordance with the provisions of the patent statutes, the principles and modes of operation of the disclosed container have been explained and illustrated in exemplary configurations.

It is intended that the scope of the present methods and apparatuses be defined by the following claims. However, it must be understood that the disclosed hydraulic system may be practiced otherwise than is specifically explained and illustrated without departing from its spirit or scope. It should be understood by those skilled in the art that various alternatives to the configuration described herein may be employed in practicing the claims without departing from the spirit and scope as defined in the following claims. The scope of the disclosed container should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A hydraulic system comprising:
   a first fluid circuit;
   a first pump fluidly connected to the first fluid circuit, the first pump configured to produce a fluid output at a first flow rate when operated at a selected speed;
   a second fluid circuit;
   a second pump selectively fluidly connectable to the first fluid circuit and the second fluid circuit, the second pump configured to produce a fluid output at a second flow rate when operated at the selected speed, the second flow rate being greater than the first flow rate of the first pump;
   a first valve moveable between a fully open position and a closed position, the first valve operable to fluidly connect the second pump to the second fluid circuit when the first valve is arranged in the fully open position, wherein when the first valve is in the fully open position, then only flow from the second pump passes to the second fluid circuit.

2. The hydraulic system of claim 1 further comprising a second valve fluidly connected to the first fluid circuit and the second pump, the second valve movable between an open position in response to the first valve being arranged in the closed position, and a closed position in response to the first valve being arranged in substantially the open position, wherein the fluid output from the second pump selectively passes through the second valve to the first fluid circuit when the first valve is arranged in the closed position, and the fluid output from the second pump is substantially blocked from passing through the second valve to the first fluid circuit when the first valve is arranged substantially in the open position.

3. The hydraulic system of claim 2 further comprising a third valve fluidly connected between the first and second fluid circuits to assist in selectively redirecting delivery of pressurized fluid as excess flow from the first fluid circuit to the second fluid circuit when the first valve is in the closed position and a combined fluid flow from the first fluid circuit and the second fluid circuit exceeds a flow requirement of the first fluid circuit, wherein the third valve is movable between an open position and a closed position, wherein when the third valve is in the open position the fluid output from the first fluid circuit substantially passes, and wherein when the third valve is arranged substantially in the closed position the fluid output from the first fluid circuit is substantially blocked.

4. The hydraulic system of claim 2, wherein the second valve is a check valve operable to substantially block fluid in the second fluid circuit from passing through the second valve when the first valve is arranged in either the closed position or the open position.

5. The hydraulic system of claim 2, wherein the second valve is a check valve configured to detect a pressure drop across the second valve, the second valve moveable from the closed position to the open position upon detecting a predetermined pressure drop.

6. The hydraulic system of claim 2, wherein substantially an entire fluid output of the second fluid pump bypasses the second valve when the first valve is arranged in the open position.

7. The hydraulic system of claim 2, wherein the second valve is arranged upstream of the first valve.

8. The hydraulic system of claim 1, wherein substantially the entire fluid output of the second pump selectively passes through the first valve when the first valve is arranged in the open position.

9. The hydraulic system of claim 1, wherein the first valve is disposed in a fluid path between the second pump and the second fluid circuit.

10. A hydraulic system comprising:
    a first fluid circuit;
    a first pump fluidly connected to the first fluid circuit;
    a second fluid circuit;
    a second pump selectively fluidly connectable to the first fluid circuit and the second fluid circuit;
    a first valve fluidly connected to the second pump and the second fluid circuit, the first valve moveable between a fully open position to fluidly connect the second pump to the second fluid circuit, and a closed position to substantially fluidly disconnect the second pump from the second fluid circuit such that, when the first valve is in the fully open position, then only flow from the second pump passes to the second fluid circuit;

a second valve fluidly connected to the second pump and the first fluid circuit, the second valve moveable between an open position to fluidly connect the second pump to the first fluid circuit when the first valve is arranged in substantially the closed position, and a closed position to substantially fluidly disconnect the second pump from the first fluid circuit when the first valve is arranged in the fully open position.

11. The hydraulic system of claim 10, wherein the first pump is configured to produce a fluid output at a first flow rate when operated at a selected speed, and the second pump configured to produce a fluid output at a second flow rate when operated at the selected speed, the second flow rate being greater than the first flow rate of the first pump.

12. The hydraulic system of claim 10, wherein the second valve is fluidly disposed between the second pump and the first valve.

13. The hydraulic system of claim 10, wherein the second valve operates in response to the first valve, the second valve moving to substantially the closed position in response to the first valve being arranged in the open position, and the second valve moving to the open position in response to the first valve being arranged in substantially the closed position.

14. The hydraulic system of claim 10, wherein the second valve is a check valve operable to substantially block fluid in the first fluid circuit from passing through the second valve when the first valve is arranged in either the closed position or the open position.

15. The hydraulic system of claim 10, wherein the second valve is a check valve configured to detect a pressure drop across the second valve, the second valve moveable from the closed position to the open position upon detecting a predetermined pressure drop.

16. The hydraulic system of claim 10, wherein the second pump is rotatably connected to the first pump for concurrent rotation therewith.

17. A method for distributing fluid within a hydraulic system having a first pump fluidly connected to a first fluid circuit, the first pump configured to deliver a fluid to the first fluid circuit at a first flow rate when operated at a selected speed, and a second pump fluidly connected to a second fluid circuit, the second pump configured to deliver a fluid to the second fluid circuit at a second flow rate when operated at the selected speed, the second flow rate of the second pump being greater than the first flow rate of the first pump, the method comprising:

operating a first hydraulic pump to produce a first fluid output;

operating a second hydraulic pump to produce a second fluid output;

delivering the first fluid output to the first fluid circuit;

delivering only the second fluid output to the second fluid circuit when operating the hydraulic system in a first mode; and delivering at least a portion of the second fluid output to the first fluid circuit when operating the hydraulic system in a second mode.

18. The method of claim 17 further comprising adjusting an output pressure of the second pump to be greater than an output pressure of the first pump when operating in the second mode.

19. The method of claim 18 further comprising adjusting an output pressure of the second pump to be less than an output pressure of the first pump when operating in the first mode.

20. The method of claim 18, wherein adjusting an output pressure of the second pump to be greater than an output pressure of the first pump comprises blocking at least a portion of the second flow from being delivered to the second fluid circuit.

21. The method of claim 17 further comprising operating the second pump at a first speed when operating in the first mode, and a second speed when operating in the second mode, wherein the first and second speeds are substantially equal.

22. The method of claim 21 further comprising operating the first pump at a third speed when operating in the first mode, and a fourth speed when operating in the second mode, wherein the third and fourth speeds are substantially equal.

23. The method of claim 17 further comprising blocking substantially all fluid flow from the first fluid circuit to the second fluid circuit when operating in the first mode.

24. The method of claim 17 further comprising operating the first pump and the second pump at substantially the same speed.

25. The method of claim 17 further comprising delivering a fluid flow from the first fluid circuit to the second fluid circuit when operating in the second mode.

* * * * *